Feb. 21, 1939.  R. G. AURIEN  2,148,363
CLASP BRAKE ARRANGEMENT
Filed Aug. 6, 1937  2 Sheets—Sheet 1
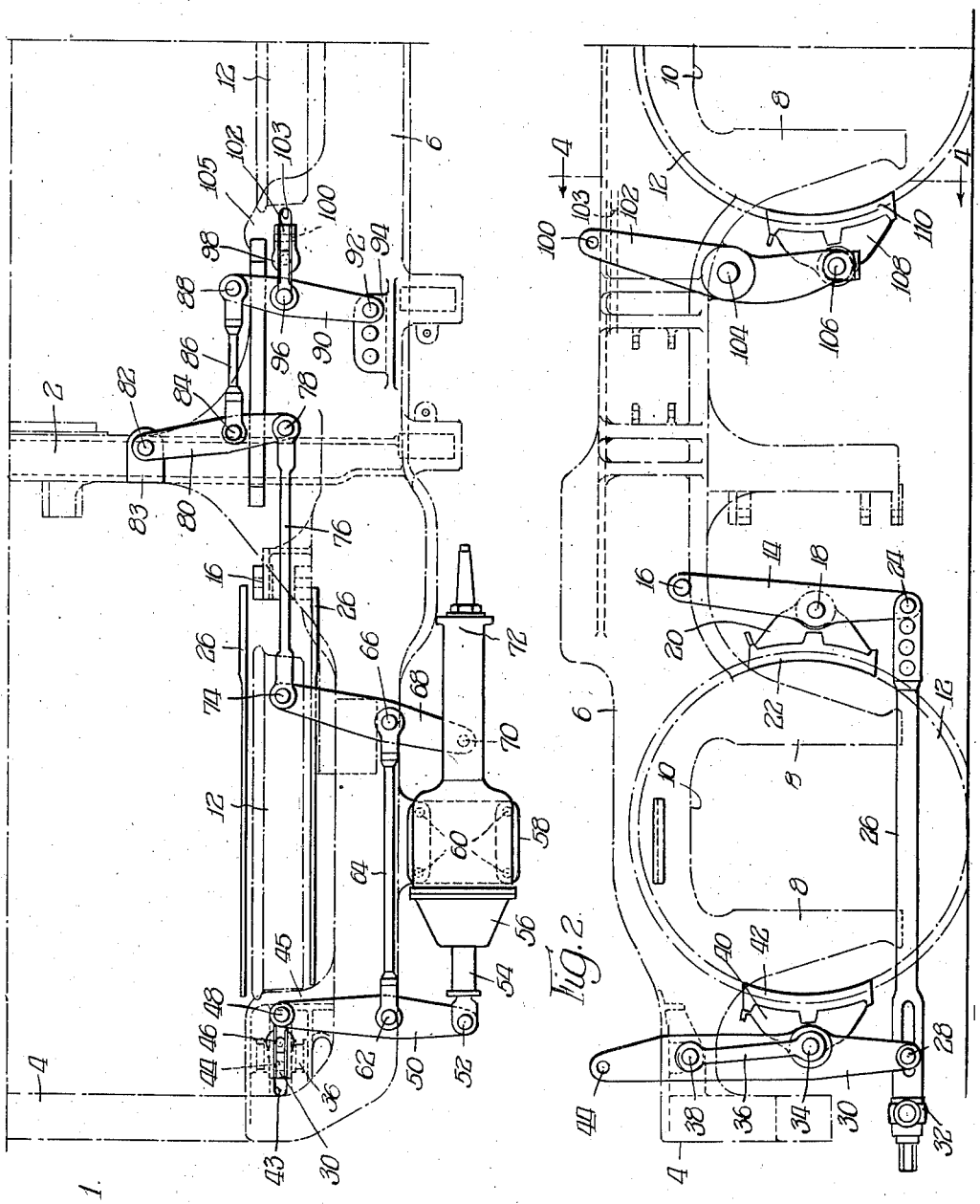
Inventor:
Ray G. Aurien, Feb. 21, 1939.  R. G. AURIEN  2,148,363
CLASP BRAKE ARRANGEMENT
Filed Aug. 6, 1937  2 Sheets-Sheet 2
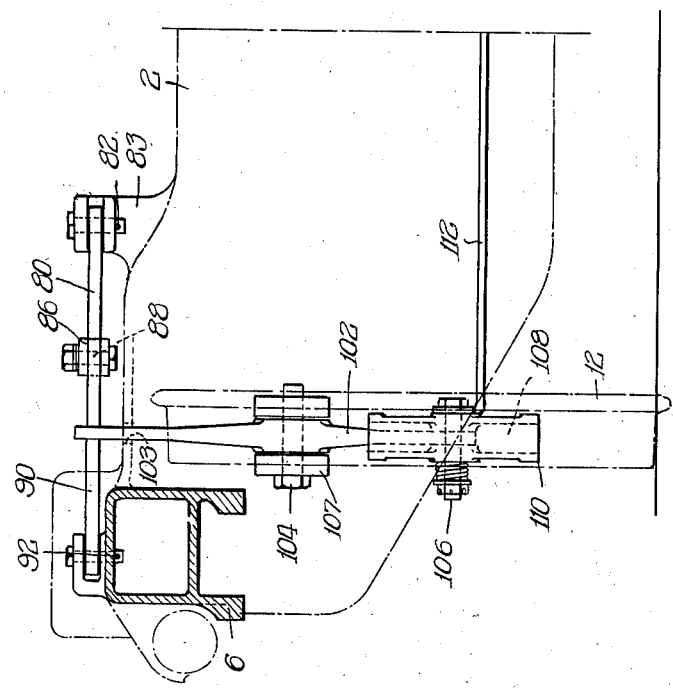
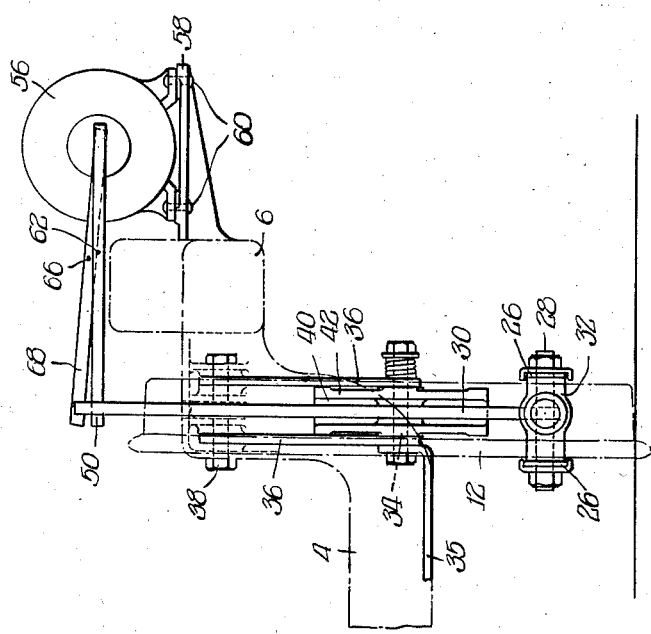
Inventor:
Ray G. Aurien, Patented Feb. 21, 1939

2,148,363

UNITED STATES PATENT OFFICE 2,148,363

CLASP BRAKE ARRANGEMENT

Ray G. Aurien, Chicago, Ill., assignor to American Steel Foundries, Chicago, Ill., a corporation of New Jersey Application August 6, 1937, Serial No. 157,685

35 Claims. (Cl. 188—46)

My invention pertains to railway brake equipment and more particularly to a class of such equipment known as clasp brakes wherein brake heads and brake shoes are supported at opposite sides of each wheel.

An object of this invention is to provide a clasp brake arrangement for a six wheel truck which will permit maximum clearance conditions between the wheels at opposite ends of the truck, thus accommodating traction motors or other driving mechanisms.

A further object is to provide such a brake mechanism of the so-called unit cylinder type wherein the power means is carried on the truck frame.

Still another object is to provide a unit cylinder clasp brake arrangement for a six wheel truck wherein power means are supported adjacent each of the four corners of the truck frame, each power means being operable to actuate its associated brake equipment independently of the other power means; and wherein each power means actuates all the brake equipment associated with a single wheel and a portion of the brake equipment associated with an adjacent wheel.

With these and various other objects in view, my invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 1 is a top plan view of a railway truck embodying my invention. Only one-quarter of the truck is shown inasmuch as the brake arrangements at the four corners of the truck are identical;

Figure 2 is a side elevation of the truck and brake arrangement shown in Figure 1;

Figure 3 is an end view of the truck and brake structures shown in Figures 1 and 2, the view being taken from the left as shown in those figures; and Figure 4 is a sectional view taken substantially in the transverse vertical plane indicated by the line 4—4 of Figure 2.

The truck construction, of more or less conventional form, has the transom 2 and the end rail 4 integrally formed with the side frame 6, said side frame having the usual pedestals 8—8, forming therebetween journal openings 10—10 for association in the usual manner with journal boxes (not shown), said journal boxes forming the connecting means with the journal ends of associated wheel and axle assemblies 12—12.

The brake mechanism comprises the hanger lever 14 inwardly of the end wheel and pivotally supported at its upper end from the side frame as at 16 and pivotally supporting intermediate its ends as at 18 the brake head 20 with the associated brake shoe 22 disposed for cooperative engagement with the adjacent wheel.

At the lower end of the hanger lever 14 is pivotally and adjustably connected as at 24 the paired inner and outer straps 26—26, the opposite ends of said straps being pivotally connected as at 28 to the lower end of the live truck lever 30, the connection at 28 being made adjustable by the manual slack adjuster 32. The truck lever 30 is pivotally supported at a point intermediate its ends as at 34 by the paired hangers 36—36, said hangers being pivotally hung at their upper ends from the truck frame as at 38. Likewise supported at the lower end of the hanger 36 and at the pivotal point 34 is the brake head 40 with the associated brake shoe 42 arranged for cooperative engagement with the opposite periphery of the before mentioned wheel. The connecting strap 35 (Figure 3) is also secured at the pivotal point 34 and its other end is similarly connected to the corresponding brake arrangement at the opposite side of the truck, thus definitely spacing the brake heads. The upper end of the live truck lever 30 projects through the elongated slot 43 (Figure 1) in the gusset 45 formed at the juncture of the side frame 6 and the end rail 4 and is pivotally connected as at 44 to the clevis means 46, the opposite end of said clevis means having a pivotal connection as at 48 to the inner end of the live cylinder lever 50, the opposite end of said cylinder lever having a pivotal connection as at 52 to the piston rod 54 associated with the power means or brake cylinder 56. The cylinder 56 is carried on the bracket 58 integrally formed as a part of the side frame 6, said cylinder being secured thereto as by means of rivets 60—60.

Intermediate the ends of the cylinder lever 50 as at 62 is connected the pull rod 64, the opposite end of said pull rod having a pivotal connection as at 66 to the dead slack adjuster lever 68, the outer end of said slack adjuster lever having a pivotal and adjustable connection as at 70 to the slack adjuster 72 which is secured on the end of the cylinder 56.

The inner end of the slack adjuster lever 68 is pivotally connected as at 74 to the pull rod 76, the opposite end of said pull rod having a pivotal connection as at 78 to the outer end of the dead auxiliary lever 80, said dead lever being fulcrumed as at 82 on the bracket 83 integrally formed with the transom 2. Intermediate the ends of the dead lever 80 as at 84 is pivotally connected the pull rod 86, its opposite end having a pivotal connection as at 88 to the dead lever 90 which is adjustably fulcrumed as at 92 on the bracket 94 integrally formed on the side frame 6. Intermediate the ends of the dead lever 90 is pivotally connected as at 96 the clevis means 98, the opposite end of said clevis means having a pivotal connection as at 100 to the upper end of the dead truck lever 102 which projects through the slot 103 formed in the gusset 105 at the juncture of the transom 2 with the side frame 6. The dead truck lever 102 is fulcrumed from the bracket 107 on the side frame 6 at a point intermediate the ends of said lever and pivotally supports from its lower end as at 106 the brake head 108 and the associated brake shoe 110 arranged for cooperative engagement with the periphery of the adjacent wheel. At the pivotal point 106 is also connected one end of the strap 112, the opposite end of said strap being in like manner connected to the corresponding brake arrangement at the opposite side of the truck.

Operation of the brake mechanism is as follows: Assuming the brakes to be in released position, actuation of the power means or brake cylinder 56 moves the piston rod 54 to the left (Figure 1) and causes the cylinder lever 50 to rotate in a clockwise direction about the pivot point 62 intermediate its ends and through the clevis 46 causes rotation of the live truck lever 30 in a clockwise direction about the pivot 28 at its lower end until the brake shoe 42 comes into engagement with the periphery of the adjacent wheel. Further actuation causes the live truck lever 30 to rotate in a clockwise direction about the pivot 34 intermediate its ends, thus moving the straps 26 to the left and causing rotation of the hanger lever 14 about the pivot 16 at its upper end until the brake shoe 22 supported thereon comes into engagement with the opposite periphery of said wheel.

Further actuation of the power means causes the cylinder lever 50 to rotate in a clockwise direction about the pivot 48 at its inner end, thus moving the pull rod 64 to the left and rotating the dead slack adjuster lever 68 in a counter-clockwise direction about the pivot 70 at its outer end. This rotation of the slack adjuster lever 68 through the connection at 74 moves the pull rod 76 to the left and rotates the dead lever 80 in a clockwise direction about the pivot 82 at its inner end. Movement of the dead lever 80 actuates the pull rod 86 which in turn through the pivot point 88 causes the dead lever 90 to move in a counter-clockwise direction about the pivot 92 at its outer end and thus through the clevis connection 98 moving the dead truck lever 102 in a counter-clockwise direction about the pivot 104 intermediate its ends until the brake shoe 110 is brought into engagement with the periphery of the adjacent wheel. Release of the power means causes the various parts to move in the reverse of the directions just specified thus releasing the brake mechanism.

It is to be understood that operation of the various parts, although described in successive steps, takes place substantially simultaneously, thus applying all the brake shoes at substantially the same moment. It will also be understood that each of the cylinders at the four corners of the truck will be actuated at the same moment, thus applying the brake mechanism to all wheels of the truck at substantially the same time.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. In a railway car truck a framework comprising integrally formed side members, end rails and transoms, power means mounted thereon adjacent the four corners, wheel and axle assemblies, live and dead truck levers supported on opposite sides of each end wheel, dead truck levers supported on opposite sides of each intermediate wheel, and connections between each of said power means and the live and dead truck levers of one end wheel and one of the dead truck levers of an intermediate wheel, said connections comprising interconnected live and dead cylinder levers connected at opposite ends of said power means, said live cylinder lever having an end connected to the live truck lever of an end wheel and said dead cylinder lever having a connection through an auxiliary lever to a truck lever of an adjacent wheel.

2. In a railway car truck a framework comprising integrally formed side members, end rails and transoms, power means mounted thereon adjacent the four corners, wheel and axle assemblies, live and dead truck levers supported on opposite sides of each end wheel, dead truck levers supported on opposite sides of each intermediate wheel, and connections between each of said power means and the live and dead truck levers of one end wheel and one of the dead truck levers of an intermediate wheel, said connections comprising interconnected live and dead cylinder levers connected at opposite ends of said power means, said live cylinder lever having an end connected to the live truck lever of an end wheel and said dead cylinder lever having a connection through a plurality of auxiliary dead levers to one of the dead truck levers associated with an adjacent wheel.

3. In a six wheel railway car truck a framework including integrally formed end rails, slide members and transoms, wheels and axles, power means mounted adjacent the four corners of said framework, clasp brake means associated with each wheel and including live and dead truck levers on opposite sides of each end wheel and dead truck levers on opposite sides of each intermediate wheel, each of said power means being operable to actuate the live and dead truck levers associated with an end wheel and one of the dead truck levers associated with an intermediate wheel, the connection to said last mentioned dead truck lever including a plurality of horizontal dead levers, and all connections between said levers being in tension when said power means is operated.

4. In a six wheel railway car truck a framework comprising integrally formed side members, end rails and transoms, wheels and axles, power means on said framework adjacent the four corners, brake rigging including live and dead truck levers supported at opposite sides of each end wheel and dead truck levers supported at opposite sides of each intermediate wheel, and connections between each of said power means and the live and dead truck levers associated with one end wheel and a dead truck lever associated with an intermediate wheel, said connections comprising dead levers fulcrumed from a transom and a side member respectively.

5. In a six wheel railway car truck a framework comprising integrally formed side members, end rails and transoms, wheels and axles, power means on said framework adjacent the four corners, brake rigging including live and dead truck levers supported at opposite sides of each end wheel and dead truck levers supported at opposite sides of each intermediate wheel, and connections between each of said power means and the live and dead truck levers associated with one end wheel and a dead truck lever associated with an intermediate wheel, said connections comprising a dead lever fulcrumed from a transom, a dead lever fulcrumed from a side member and a dead lever fulcrumed from said power means.

6. In a six wheel railway car truck a framework comprising integrally formed side members, end rails and transoms, wheels and axles, power means on said framework adjacent the four corners, brake rigging including live and dead truck levers supported at opposite sides of each end wheel and dead truck levers supported at opposite sides of each intermediate wheel, and connections between each of said power means and the live and dead truck levers associated with one end wheel and a dead truck lever associated with an intermediate wheel, said connections comprising a plurality of horizontal dead levers, and all said lever connections being in tension when said power means is operated.

7. In a six wheel railway car truck a framework comprising integrally formed side members, end rails and transoms, wheels and axles, power means on said framework adjacent the four corners, brake rigging including live and dead truck levers supported at opposite sides of each end wheel and dead truck levers supported at opposite sides of each intermediate wheel, and connections between each of said power means and the live and dead truck levers associated with one end wheel and a dead truck lever associated with an intermediate wheel, said connections comprising a plurality of horizontal dead levers, one of said dead levers having a connection intermediate its ends to said last mentioned dead truck lever.

8. In a six wheel railway car truck a framework comprising integrally formed side members, end rails and transoms, wheels and axles, power means on said framework adjacent the four corners, brake rigging including live and dead truck levers supported at opposite sides of each end wheel and dead truck levers supported at opposite sides of each intermediate wheel, and connections between each of said power means and the live and dead truck levers associated with one end wheel and a dead truck lever associated with an intermediate wheel, said connections comprising a plurality of horizontal dead levers, one of said horizontal dead levers having a connection intermediate its ends to said last mentioned dead truck lever and another of said horizontal dead levers being fulcrumed from one end of said power means.

9. In a six wheel railway car truck a framework, power means mounted on said framework adjacent the four corners thereof, and brake rigging including live and dead truck levers on opposite sides of each end wheel, and dead truck levers on opposite sides of each middle wheel, each of said power means being operative to actuate the live and dead truck levers associated with one end wheel and a dead truck lever associated with an intermediate wheel, the connections between said power means and said dead truck lever comprising a dead auxiliary lever fulcrumed from said framework, and all connections between said levers being in tension when said power means is operated.

10. In a six wheel railway car truck a framework comprising integrally formed side members, end rails and transoms, wheels and axles, power means on said framework adjacent the four corners, brake rigging including live and dead truck levers supported at opposite sides of each end wheel and dead truck levers supported at opposite sides of each intermediate wheel, and connections between each of said power means and the live and dead truck levers associated with one end wheel and a dead truck lever associated with an intermediate wheel, said connections comprising a dead lever fulcrumed from a transom, and all said lever connections being in tension when said power means is operated.

11. In a six wheel railway car truck a framework comprising integrally formed side members, end rails and transoms, wheels and axles, power means on said framework adjacent the four corners, brake rigging including live and dead truck levers supported at opposite sides of each end wheel and dead truck levers supported at opposite sides of each intermediate wheel, and connections between each of said power means and the live and dead truck levers associated with one end wheel and a dead truck lever associated with an intermediate wheel, said connections comprising a dead lever fulcrumed from said side member, and all connections between levers being in tension when said power means is actuated.

12. In a six wheel railway car truck a framework including integrally formed side members, end rails and transoms, power means mounted adjacent opposite ends of each side member, clasp brake means associated with each wheel, and connections between each of said power means and the brake means associated with an end wheel and a portion of the brake means associated with an intermediate wheel, said connections comprising a plurality of dead levers fulcrumed respectively from a side member and a transom.

13. In a six wheel railway car truck a framework including integrally formed side members, end rails and transoms, power means mounted adjacent opposite ends of each side member, clasp brake means associated with each wheel, and connections between each of said power means and the brake means associated with an end wheel and a portion of the brake means associated with an intermediate wheel, said connections comprising auxiliary dead levers fulcrumed respectively from said power means and a transom.

14. In a six wheel railway car truck a framework including integrally formed side members, end rails and transoms, power means mounted adjacent opposite ends of each side member, clasp brake means associated with each wheel, and connections between each of said power means and the brake means associated with an end wheel and a portion of the brake means associated with an intermediate wheel, said connections comprising dead levers fulcrumed respectively from said power means and a side member.

15. In a six wheel railway car truck a framework including integrally formed side members, end rails and transoms, power means mounted adjacent opposite ends of each side member, clasp brake means associated with each wheel, and connections between each of said power means and the brake means associated with an end wheel and a portion of the brake means associated with an intermediate wheel, said connections comprising dead levers fulcrumed respectively from said power means, a side member and a transom.

16. In a six wheel railway car truck a framework including integrally formed side members, end rails and transoms, power means mounted adjacent opposite ends of each side member, clasp brake means associated with each wheel, and connections between each of said power means and the brake means associated with an end wheel and a portion of the brake means associated with an intermediate wheel, said connections comprising interconnected live and dead cylinder levers connected to opposite ends of said power means, and a dead auxiliary lever fulcrumed from a transom.

17. In a six wheel railway car truck a framework including integrally formed side members, end rails and transoms, power means mounted adjacent opposite ends of each side member, clasp brake means associated with each wheel, connections between each of said power means and the brake means associated with an end wheel and a portion of the brake means associated with an intermediate wheel, said connections comprising interconnected live and dead cylinder levers connected to opposite ends of said power means, and a dead auxiliary lever fulcrumed from a side member.

18. In a six wheel railway car truck a framework including integrally formed side members, end rails and transoms, power means mounted adjacent opposite ends of each side member, clasp brake means associated with each wheel, and connections between each of said power means and the brake means associated with an end wheel and a portion of the brake means associated with an intermediate wheel, said connections comprising interconnected live and dead cylinder levers connected to opposite ends of said power means, and dead auxiliary levers fulcrumed respectively from a transom and a side member.

19. In a six wheel railway car truck a framework including integrally formed end rails, side members and transoms, wheels and axles, power means mounted adjacent the four corners of said framework, clasp brake means associated with each wheel and including live and dead truck levers on opposite sides of each end wheel and dead truck levers on opposite sides of each intermediate wheel, and connections between said power means and said clasp brake means, each of said connections including a plurality of horizontal dead levers, and all connections between said levers being in tension when said power means is operated.

20. In a six wheel railway car truck a frame having a transom and a side rail, wheel and axle assemblies, power means mounted on the frame adjacent an end wheel, interconnected live and dead cylinder levers connected to opposite ends of said power means, brake means including brake heads and brake shoes supported on opposite sides of said end wheels and a brake head and brake shoe supported on one side of an adjacent wheel, and connections between said cylinder levers and said brake means, said connections including a dead cylinder lever fulcrumed from said transom, all connections of said levers being in tension when operative.

21. In a six wheel railway car truck a frame having a transom and a side rail, wheel and axle assemblies, power means mounted on the frame adjacent an end wheel, interconnected live and dead cylinder levers connected to opposite ends of said power means, brake means including brake heads and brake shoes on opposite sides of said end wheels and a brake head and brake shoe on one side of an adjacent wheel, and connections between said cylinder levers and said brake means, said connections including dead levers fulcrumed from said transom and said side rail, all connections of said levers being in tension when operative.

22. In a six wheel railway car truck a frame having a transom and a side rail, wheel and axle assemblies, power means and slack adjuster means mounted on said side rail, interconnected live and dead cylinder levers connected respectively to said power means and to said slack adjuster, brake means including brake heads and brake shoes on opposite sides of an end wheel and a brake head and shoe on one side of an adjacent wheel, and connections between said cylinder levers and said brake means, said connections comprising a dead lever fulcrumed from said side rail and operatively connected through another dead lever to said dead cylinder lever.

23. In a six wheel railway car truck a frame having a transom and a side rail, wheel and axle assemblies, power means and slack adjuster means mounted on said side rail, interconnected live and dead cylinder levers connected respectively to said power means and to said slack adjuster, brake means including brake heads and brake shoes on opposite sides of an end wheel and a brake head and shoe on one side of an adjacent wheel, and connections between said cylinder levers and said brake means, said connections comprising a dead lever fulcrumed from said transom and operatively connected to said dead cylinder lever.

24. In a six wheel railway car truck a frame having a transom and a side rail, wheel and axle assemblies, power means and slack adjuster means mounted on said side rail, interconnected live and dead cylinder levers connected respectively to said power means and to said slack adjuster, brake means including brake heads and brake shoes on opposite sides of an end wheel and a brake head and shoe on one side of an adjacent wheel, and connections between said cylinder levers and said brake means, said connections comprising a dead lever fulcrumed from said transom and operatively connected to said dead cylinder lever, said connections between levers being in tension when operative.

25. In a six wheel railway car truck a frame having a transom and a side rail, wheel and axle assemblies, power means and slack adjuster means mounted on said side rail, interconnected live and dead cylinder levers connected respectively to said power means and to said slack adjuster, brake means including brake heads and brake shoes on opposite sides of an end wheel and a brake head and shoe on one side of an adjacent wheel, and connections between said cylinder levers and said brake means, said connections comprising a dead lever fulcrumed from said side rail, and a dead lever fulcrumed from said transom and operatively connected between said before mentioned dead levers.

26. In a six wheel railway car truck a frame having a transom and a side rail, wheel and axle assemblies, power means and slack adjuster means mounted on said side rail, interconnected live and dead cylinder levers connected respectively to said power means and to said slack adjuster, brake means including brake heads and brake shoes on opposite sides of an end wheel and a brake head and shoe on one side of an adjacent wheel, and connections between said cylinder levers and said brake means, said connections comprising a dead lever fulcrumed from said side rail, and a dead lever fulcrumed from said transom and operatively connected between said before mentioned dead levers, all connections between levers being in tension when operative.

27. In a six wheel railway car truck a frame having side rails and a transom, end and intermediate wheel and axle assemblies, power means and slack adjuster means mounted on said frame at opposite sides and adjacent one end thereof, interconnected live and dead cylinder levers connected respectively to said power means and to said slack adjuster means at each side of said frame, and brake means including brake heads and brake shoes applied to opposite sides of the wheels of said end assembly and to one side of the wheels of said intermediate assembly, and connections between said live and dead cylinder levers and said brake means, said connections including dead levers fulcrumed from said side rails and auxiliary levers fulcrumed from said transom and operatively connected respectively between said dead levers and said dead cylinder levers.

28. In a six wheel railway car truck a frame having side rails and a transom, end and intermediate wheel and axle assemblies, power means and slack adjuster means mounted on said frame at opposite sides and adjacent one end thereof, interconnected live and dead cylinder levers connected respectively to said power means and to said slack adjuster means at each side of said frame, and brake means including brake heads and brake shoes applied to opposite sides of the wheels of said end assembly and to one side of the wheels of said intermediate assembly, and connections between said live and dead cylinder levers and said brake means, said connections including dead levers fulcrumed from said side rails and auxiliary levers fulcrumed from said transom and operatively connected respectively between said dead levers and said dead cylinder levers, all of said connections between levers being in tension when operative.

29. In a railway car truck, a frame having a transom and a side rail, end and intermediate wheel and axle assemblies, braking means for said assemblies, power means mounted on the frame adjacent an end wheel, interconnected live and dead cylinder levers connected to opposite ends of said power means, and connections between said cylinder levers and said brake means, said connections comprising a dead cylinder lever fulcrumed from said transom and interconnected between the braking means associated with an intermediate wheel and said dead cylinder lever.

30. In a six wheel railway car truck, a frame having side rails and a transom, end and intermediate wheel and axle assemblies, power means mounted on each of the side rails adjacent an end wheel and axle assembly, interconnected live and dead cylinder levers connected to opposite ends of said power means respectively, brake means for said wheel and axle assemblies, and connections between said cylinder levers and said brake means, said connections comprising dead levers fulcrumed from a side rail and from said transom for each of said power means and operatively connected thereto through said dead cylinder levers respectively, all connections of said levers being in tension when operative.

31. In a six wheel railway car truck, a frame having side rails and a transom, end and intermediate wheel and axle assemblies, power means mounted on each of the side rails adjacent an end wheel and axle assembly, interconnected live and dead cylinder levers connected to opposite ends of said power means respectively, brake means for said wheel and axle assemblies, and connections between said cylinder levers and said brake means, said connections comprising dead levers fulcrumed from said side rails and operatively connected through other dead levers respectively to said dead cylinder levers for actuation of the brake means associated with an intermediate assembly.

32. In a railway car truck having end and intermediate wheel and axle assemblies, a framework including integrally formed side members, end rails and transoms, power means mounted adjacent opposite ends of each side member, clasp brake means associated with each wheel, and connections between each of said power means and brake means associated with an end wheel and an intermediate wheel, said connections comprising a plurality of dead levers fulcrumed respectively from a side member and a transom.

33. In a railway car truck having end and intermediate wheel and axle assemblies, a framework including integrally formed side members, end rails and transverse load carrying members, power means mounted adjacent opposite ends of each side member, clasp brake means associated with each wheel, and connections between each of said power means and brake means associated with an end wheel and an intermediate wheel, said connections comprising auxiliary dead levers fulcrumed respectively from said power means and a load carrying member.

34. In a railway car truck having end and intermediate wheel and axle assemblies, a framework including integrally formed side members, end rails and transverse load carrying members, power means mounted adjacent opposite ends of each side member, brake means associated with each wheel, and connections between each of said power means and brake means associated with an end wheel and an intermediate wheel, said connections comprising dead levers fulcrumed respectively from said power means and a side member.

35. In a railway car truck having end and intermediate wheel and axle assemblies, a framework including integrally formed side members, end rails and transverse load carrying members, power means mounted adjacent opposite ends of each side member, brake means associated with each wheel, and connections between each of said power means and the adjacent brake means associated with an end wheel and an intermediate wheel, said connections comprising dead levers fulcrumed respectively from said power means and from one of said members.

RAY G. AURIEN.